Sept. 22, 1964 K. M. BRANSCOME 3,149,835
DOCUMENT SENSING DEVICE
Filed Oct. 11, 1962 3 Sheets-Sheet 1

INVENTOR
Kenneth M. Branscome
BY John R. Manning
ATTORNEY

Sept. 22, 1964 K. M. BRANSCOME 3,149,835
DOCUMENT SENSING DEVICE
Filed Oct. 11, 1962 3 Sheets-Sheet 2
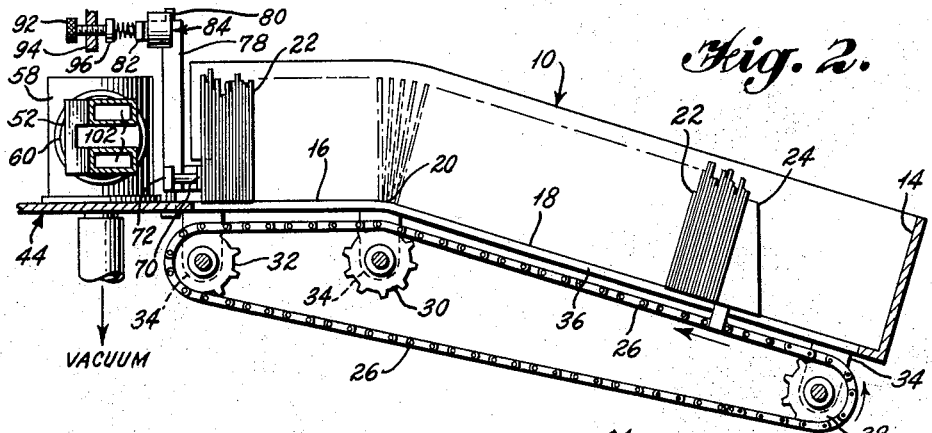
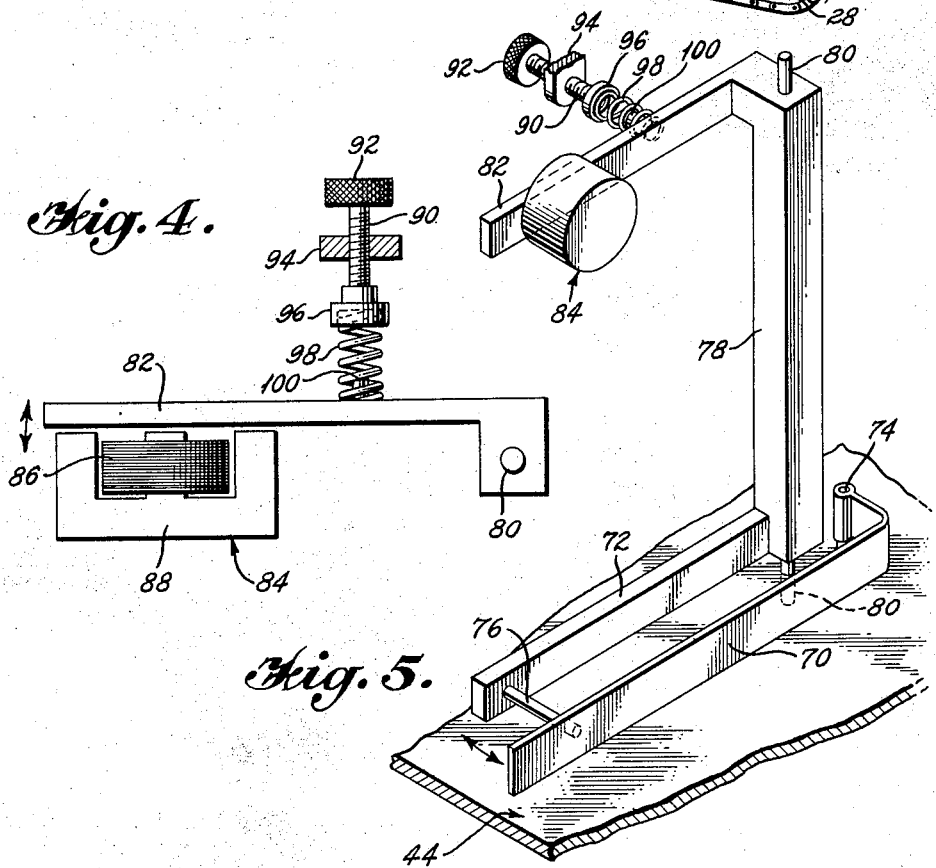

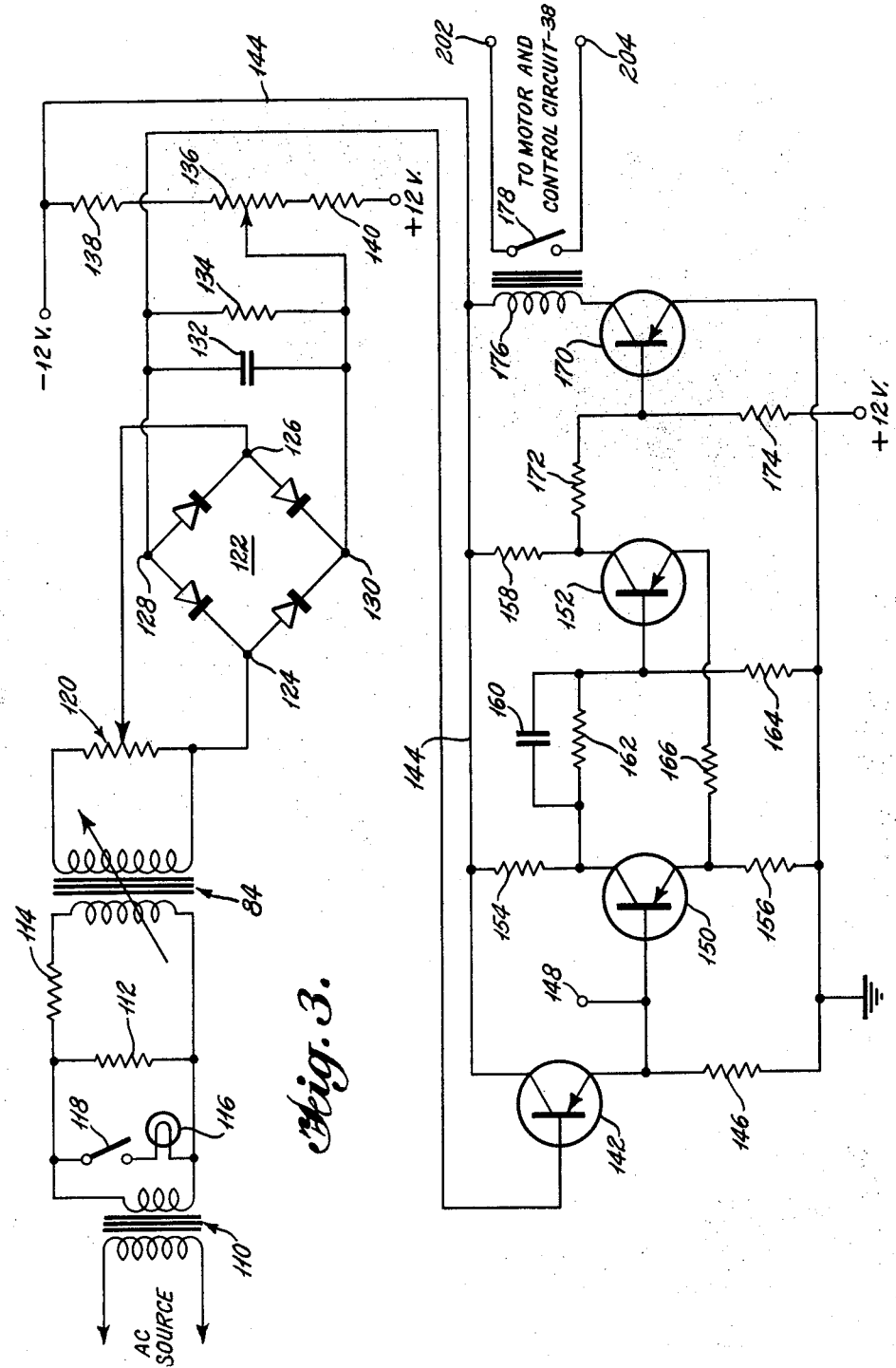

United States Patent Office 3,149,835
Patented Sept. 22, 1964

---

3,149,835
DOCUMENT SENSING DEVICE
Kenneth M. Branscome, Dallas, Tex., assignor to Sperry Rand Corporation, New York, N.Y., a corporation of Delaware
Filed Oct. 11, 1962, Ser. No. 229,941
11 Claims. (Cl. 271—62)

This invention relates to document feeding systems and more specifically to apparatus for advancing a stack of documents, such as bank checks and the like, along a document table and to a document pick-up device at a delivery station which is capable of separating the documents individually and successively from the stack of documents.

Present day business operations require the processing of voluminous numbers of documents. One such business operation which has received the full impact of processing large numbers of documents is the banking industry. Bank checks and drafts are presently used for the payment of goods, services, etc., to the exclusion of practically any other method of payment. Accordingly, as our economy moves upwardly, increasing numbers of bank checks or documents are drawn on the depositor institution.

In the past, the typical banking institution has had to maintain a large staff of clerical assistants for the processing of the checks, drafts, deposit slips, etc. These large staffs of clerical people are expensive to maintain, process documents at a relatively slow rate, and are inefficient in that a great number of errors are committed. Accordingly, it was necessary that some mechanical and electronic means be devised to quickly and accurately process the bank documents at a minimum charge or cost to the banking institution.

As modern business has increased in size and complexity automatic means must now be utilized for handling business documents. In addition, institutions or industries involving sales, transportation, as well as banks and the like, are faced with the problem of sorting and accounting on a day-to-day basis for documents such as the checks, deposit slips, tickets, sales slips, etc. in quantity such that manual handling of these business documents become almost a hopeless undertaking. Although several systems have been devised in working toward a solution to this problem, it appears at present that the use of human language symbols printed in magnetic ink on the documents themselves, in conjunction with equipment capable of recognizing these symbols automatically, offers perhaps the most practical means for minimizing the manual handling of the documents. If the magnetic ink symbols are to be read and the system operated at a high rate of speed, means must be provided to automatically and sequentially advance the documents from a feed table or station to the reading station. It is in this light that the present invention has been made, eliminating some limitations inherent in document advancing devices previously developed.

It is desirable, therefore, that documents be advanced rapidly and singularly so that accurate and rapid sorting may take place. Furthermore, it is desirable that, although the documents be multilated in some manner, they may be suitably advanced from the document feeding table to the read station and accurately sorted into their respective pockets of a sorting device.

Many known document feeding devices for high speed document sorting operations where inefficient in that additional documents could not be loaded into the feed hopper or table while the sorting system was in operation. In addition, the document advancing mechanisms of these devices were not sensitive enough to advance single sheets to the pick-up means for introduction into the transport system. As the advancing means of the document feed table moved the documents toward the pick-up device, two or more documents would be forced into the transport system thus casing a jam condition or erroneous reading and sorting of the documents. Also, in these prior systems, the advancing means may not present a document to the pick-up means and thus a cycle would be skipped and the possibility of synchronization of the system would be lost.

Accordingly, it is desirable that a system for advancing documents to a high speed document sorter be devised which incorporates a document sensing or document pressure device which will drive the feed table according to the rate at which the documents are discharged and not force two or more documents into the transport system but still have a document ready to be picked up by he pick-up means during the pick-up cycle. Further, it is desirable that the feed table of a high speed document sorting system be constructed so that the frictional forces between the documents are minimized so that accurate and rapid advancement and sorting of the documents be accomplished.

Accordingly, it is the principal object of the present invention to improve document advancing mechanisms.

It is a further object of the present invention to improve document advancing mechanisms of the high speed type.

It is another object of the present invention to provide an improved document feeding mechanism for feeding documents individually and successively from a stack of documents with a high degree of accuracy and reliability.

It is a still further object of the present invention to utilize electronic means for sensing the force created by the documents against a member in the document input tray.

It is a still further object of the present invention to provide a transformer having a variable gap which is positioned according to the force of the documents against a sensing arm which is coupled to the transformer.

In accordance with the above objects, the invention comprises a force sensing mechanism whose output may be utilized to drive or advance a device such as a document advancing means. A transformer composed of "E" and "I" laminations is utilized as the sensing device. The "I" laminations are physically removed from the transformer but are positioned adjacent the transformer and in a movable manner. Means are coupled from the "I" laminations to a member positioned in front of the documents so that the various forces exerted by the documents against the sensing member will cause the "I" laminations to be moved toward or away from the transformer coil and the "E" laminations. Thus, the operation of the "I" laminations causes a varying flux in the transformer and will cause the transformer to produce an output which is proportional to the distance that the "I" laminations are from the transformer coil and the "E" laminations. In the preferred embodiment, a section of iron was used as the movable element of the transformer rather than the removed "I" laminations of the original transformer. Means are provided to adjust the pressure required to actuate the arm of the transformer, which means are mechanically coupled to the movable iron element. The output of the variable gap transformer is rectified and filtered and applied to a bias level adjustment potentiometer. The output from the potentiometer is coupled to the base of a driver transistor stage whose ouput can be utilized to drive a D.C. motor or an A.C. motor. In the case of driving a D.C. motor which in turn drives the back plate of the document feed table, the D.C. motor may be driven directly from the driver transistor stage. In the event that one wishes to drive an A.C. motor (or even a D.C. motor)

in "on" and "off" cycles, it is preferred that the output of the driver transistor stage be directed to a Schmitt trigger whose output is coupled to a relay driver transistor stage. The relay coil is coupled in series with the collector of the relay driver stage whose output will indirectly drive the A.C. motor which is in turn connected to drive the back plate of the document advancing means located on the feed table.

Further features and objects of the present invention will be found throughout a more detailed description and a better understanding of the invention will be afforded by the following detailed description considered in conjunction with the accompanying drawings in which:

FIGURE 2 is a sectional view taken along the lines 2—2 of the FIGURE 1 and showing the document feed table;

FIGURE 3 is an electrical schematic of the document pressure or force sensing mechanism;

FIGURE 4 is a view of the variable gap transformer showing the movable leg; and

FIGURE 5 is a perspective view of the document sensing means coupled to the movable leg of the variable gap transformer.

Figure 1:
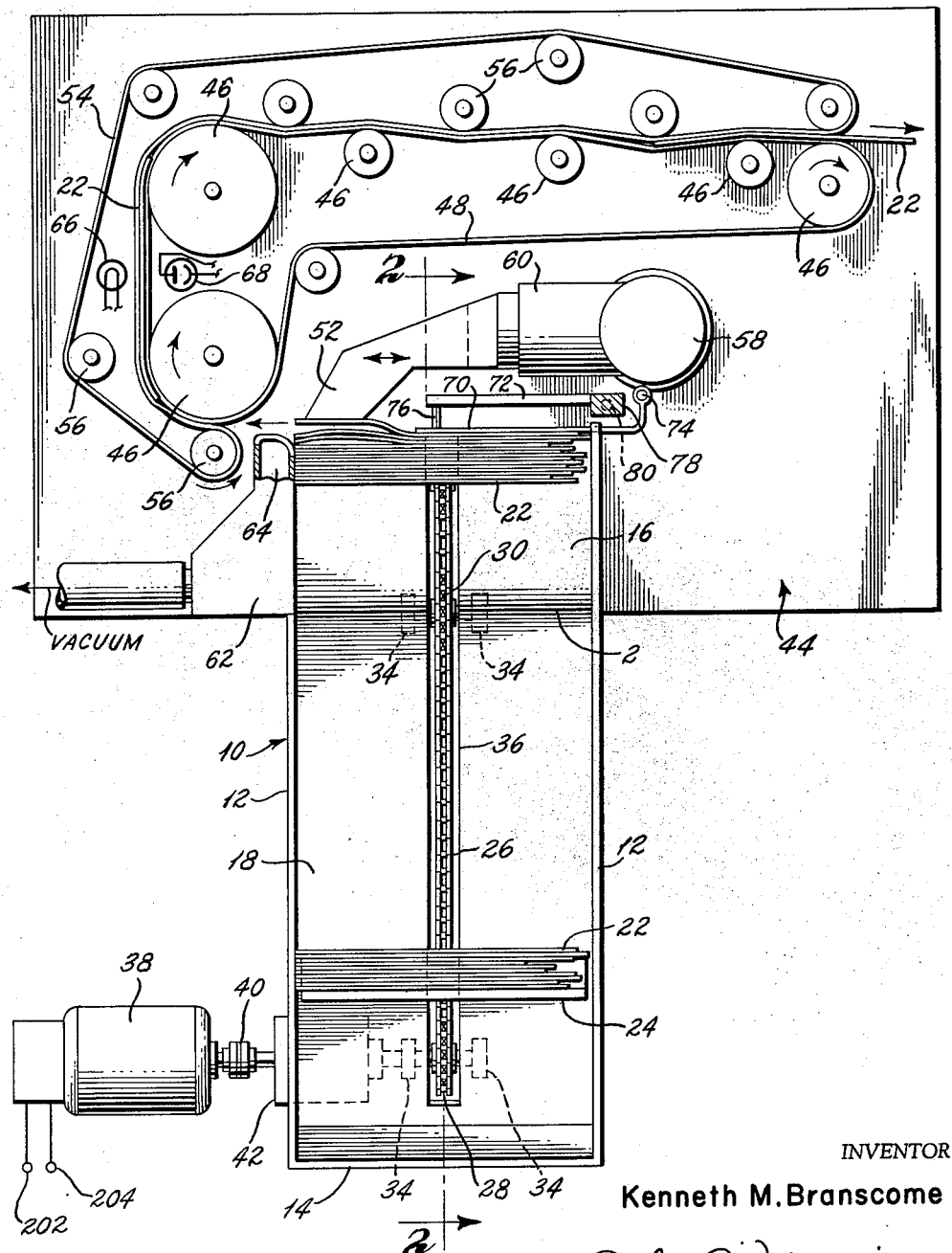
FIGURE 1 is a top plan view showing the document feed table, the pick-up arm and a portion of the belt transport means.

As shown in the FIGURE 1, a document table or tray 10 is formed having the side members 12, which members 12 are at a distance apart to accommodate the longest check that is to be sorted. The document table 10 has an end member 14 which forms the rearwardmost member of the document table 10 and may be at a distance from the document pick-up means to accommodate the desired number of documents. The bottom supporting members of the document table 10 comprises a horizontal portion and a sloped or downwardly extending portion. As best shown in the FIGURE 2, the horizontal bottom member 16 is positioned adjacent the pick-up arm and extends rearwardly to engage the sloped or downwardly extending portion 18 at the point 20. It is not necessary that the members 16 and 18 be two members but may be one member and slightly bent as shown at the junction 20. As the documents travel from the sloped or downwardly extending portion 18 of the document table 10 to the horizontal portion 16, they are "fanned" as the documents 22 pass over the junction 20. This action causes a reduction of the frictional forces between the documents and tends to separate them while reducing the force necessary to drive the documents forward while still maintaining maximum sensitivity of the document pressure sensing device, to be hereinafter described. In addition, an important aspect of the invention is that the tendency of the documents to fall forward is minimized or eliminated while the documents are supported by the member 18. In an embodiment of the invention which was constructed and satisfactorily operated according to the principles of this invention, the length of the horizontal bottom member was approximately 2¾ inches and the angle between the members 16 and 18 was 9 degrees.

As shown in the FIGURES 1 and 2, the documents 22 are driven forward by a back plate 24 which is connected to a belt or chain 26. The belt or chain 26 is supported by pinions or sprocket gears 28, 30, and 32 which are positioned under the document table 10 and in such a manner that the upper length of the chain 26 forms a path similar to the path formed by the horizontal bottom member 16 and the sloped or downwardly extending member 18. As shown in the FIGURE 2, the pinion or sprocket 32 returns the chain 26 to the pinion or sprocket 28. The pinion 30 is located immediately below the junction 20 of the members 16 and 18. The pinions 28, 30, and 32 are suitably supoprted by the support members 34 as shown in the FIGURE 1. A portion of the horizontal bottom member 16 and a portion of the sloped or downwardly extending bottom member 18 is removed to permit the back plate 24 to be coupled to the chain 26 and thus advance the documents as the chain is driven, which removed portion is as shown at 36 of the FIGURE 1.

As shown in the FIGURE 1, a driving means 38, which in one embodiment of the invention may be a D.C. motor and driven substantially continuously and in a second embodiment of the invention may be an A.C. motor driven in "on" and "off" cycles, is adapted to rotate the pinion 28 through a coupling 40 and a speed reducing mechanism 42, which speed reducing mechanism 42 may be one of a type well known in the art. Means are employed in the driving means to stop the driving means as soon as an "off" command is received so that "coasting" is minimized. The speed reducer 42 is adapted to drive the pinion 28 in a counterclockwise direction only, as shown in the FIGURE 2, so that when the back plate 24 is forced rearwardly to insert additional documents into the document table 10, the driving means 38 will continue to operate in its normal rotational direction.

Means for transporting the documents after leaving the feed table are shown in the FIGURE 1. A plurality of pulleys 46 are supported upon a base member 44 and engage a belt or flexible member 48. The belt 48 is of a type of flexible material, such as a plastic member, which is somewhat narrower in width than the width of the narrowest check or document to be transported and rotates in a generally clockwise direction to receive the documents 22 from a pick-up arm 52 through the system. A second belt 54 engages the belt 48 and may be driven by frictional engagement with the belt 48. The belt 48 or the belt 54 may be driven by any suitable means, not shown. The second belt 54 is supported by a plurality of pulleys 56 which are mounted upon the base member 44.

A vacuum pick-up arm 52 lifts the first document 22 from the stack and feeds it between the two belts 48 and 54 which are driven and guided by a system of pulleys 46 and 56 as hereinbefore described. For a more detailed description of the belt transport system and pick-up means, reference may be had to application Serial No. 53,742, filed September 2, 1960, now Patent No. 3,079,147, for "Sheet Feeding," and assigned to the same assignee as the present invention.

The arm 52 feeds the documents from the stack one at a time to a point where the belts 48 and 54 come together, whereupon the sheets are gripped by the belts 48 and 54 and are transported by the belts 48 and 54 between the pulleys 50 and 56 where the sheets or documents are fed out of the mechanism. The peripheral speed of the belts and pulley system is operated to be faster than the operation of the lateral moving arm or pick-up device 52 so that acceleration of the documents 22 is accomplished. This feature causes the belts 48 and 54 to pull the sheets positively from the pick-up arm 52 without bending or crumpling of the sheets by the mechanism. After delivering a sheet from the stack of sheets or documents to the point where the belts 48 and 54 grip the document, the arm 52 returns to the stack where it picks up another sheet. The vacuum pick-up arm 52 moves in a straight line motion from adjacent the top of the stack to the point where the belts 48 and 54 come together while it is carrying a sheet and then returns from this point to the pick-up position adjacent the first document, in a path which curves away from the stack so that the arm will not tend to make a pick-up before it is again in the pick-up position. The pick-up arm 52 oscillates about a member 58 which is suitably supported upon the base member 44 and in addition, the pick-up arm 52 oscillates within a chamber 60 which is rigidly affixed to the member 58. Vacuum ports (not shown) are provided within the chamber 60 to apply a vacuum to the sheet or document engaging portion of the pick-up arm 52 during the document pick-up cycle and to inhibit the vacuum during the return motion of the pick-up arm 52. For a more detailed description of the vacuum ports or ducts, reference may be had to the aforementioned application. The pick-up arm 52 comes to a substantially complete stop each time it comes to the pick-up position adjacent the first document of the stack of documents. The pick-up arm 52 is driven in this motion by means of a linkage mechanism (not shown) which is fully described in the aforementioned copending application.

As shown in the FIGURE 1, means are provided for "holding off" any double documents that may be inadvertently picked up by the pick-up arm 52 during its document advance cycle. This means comprises a chamber 62 having an extending portion 64 which is positioned immediately between the leading edge of the first document and the position where the belts 48 and 54 come together to transport the document. The extending portion 64 of the chamber 62 has a plurality of ribbed openings that the documents 22 pass over each cycle. With the application of a vacuum to the chamber 62 as shown, any documents underneath the first document which would inadvertently be moved towards the belt transport system would be held by the vacuum applied to the extending portion 64 until the next document pick-up cycle. In addition, the ribbed openings in the extending portion 64 tend to fan the documents in that area, and reduce their frictional engagement to permit only one document to be picked up at a time by the pick-up arm 52.

As the last document is fed from the feed table, the back plate 24 will be forced against the sensing finger 70 and cause the arm 82 to assume a position furthermost from the transformer 84. This action inhibits the document advance means.

A document presence detector is provided in the mechanism of the FIGURE 1 by the light source 66 and the photoelectric pick-up 68 which are positioned in such a manner on the base member 44 that the light from the light source 66 to the photoelectric pick-up 68 would be cut off while a document is passing between them, as transported by the belt transport system. The light source 66 and the photoelectric pick-up 68 may be connected to any suitable source of voltage (not shown). The output from the photoelectric pick-up 68 may be utilized in any manner desired.

The force exerted by the documents against a force sensing mechanism generates the "on" and "off" commands for advancing the documents. The sensing means, as shown in section as the sensing finger 70 and the arm 72, are shown in perspective view in FIGURE 5. A force less than a predetermined value exerted by the documents 22 against the sensing finger 70 indicates a depletion of documents at the discharge area and causes movement of the document advancing mechanism sufficient to return the force to the predetermined value, which mechanism is composed of the driving means 38, the coupling 40, the speed reducer 42, the pinions 28, 30, and 32, the belt or chain 26 and the back plate 24. A force greater than the predetermined value exerted by the documents 22 against the sensing finger 70 indicates sufficient documents available for removal and will cause the document advance to be stopped or to be advanced at a slower rate.

As shown in the FIGURE 5, the sensing finger 70 is mounted for movement about a pin 74, which pin is supported by the base member 44. The force exerted against the sensing finger 70 is transmitted to an arm 72, which arm 72 is substantially parallel to the sensing finger 70, through a cylindrical member 76 which is connected between the sensing finger 70 and the arm 72. The arm 72 is affixed to a vertically extending member 78 which pivots about a shaft 80, which shaft 80 is supported at its lower end by the base member 44 and by any suitable means at its upper end. A metallic arm 82 forms part of the transformer circuit of the FIGURE 4, and is supported by the vertically extending member 78 and at right angles to the member 78. Thus, the members 72, 78, and 82 are substantially U shaped with the members 72 and 82 being the extending portions of the U. As shown more in detail in the FIGURE 4, the metallic arm 82, which arm may be composed of iron, is positioned adjacent a transformer 84. The transformer 84, having a coil 86, is mounted upon an "E" assembly 88.

As shown in the FIGURE 4, the core structure of the transformer 84, including the arm 82 and the "E" laminations 88 having the form of a figure 8. The entire flux passes through the central part of the core, but outside of this central core it divides, half going in each direction through the outside members of the "E" laminations. The primary and secondary conductors of the coil 86 may be bifilar or in the shape of pancakes and are usually wound with strip copper although any conventional conductor may be utilized. The coils comprising the primary and secondary are usually taped and stacked so that each primary is adjacent to a secondary. In this manner the leakage flux of both primary and secondary is reduced to a very small value. As shown in the FIGURES 4 and 5, as the sensing finger 70 is forced rearwardly by engagement with the documents 22, it will pivot about the pin 74 and due to the coupling between the members 70 and 72, the member 72 will also be driven rearwardly. This motion of the arm 72 will cause, through the vertically extending member 78, the metallic arm 82 to be driven away from the metallic circuit of the transformer 84. As the arm 82 pivots away from the core or laminations 88 of the transformer 84, a greater air gap will exist between the elements 82 and 88 thereby reducing the magnetic flux of the circuit. Since in a magnetic circuit the reluctance is dependent upon the flux through the iron of the transformer, the reluctance of the circuit is increased. The permeability of good magnet iron is 2000 or more while that of air is unity. Even a very short air gap in an iron magnetic circuit may greatly increase the reluctance. This movement, therefore, of the metallic arm 82 away from the transformer 84 will affect the secondary current of the transformer and thus produce an output which is inversely proportional to the distance that the arm 82 is moved away from the core 88 of the transformer 84. Similarly, if the force of the documents against the sensing finger 70 is reduced, the arm 82 will be moved toward the core 88 of the transformer 84 thus, reducing the reluctance of the circuit and increasing the magnetic flux, thereby increasing the output of the secondary of the transformer 84. As a result, the varying output from the secondary of the transformer 84 caused by excursions of the arm 82, may be coupled to circuits to control the advancement of the documents 22 in the document table 10 of the FIGURES 1 and 2.

Means are provided to adjust the sensitivity or the force of the documents required to actuate the arm 82 of the transformer circuit as shown best in the FIGURES 2, 4 and 5. A threaded member 90 having a knurled portion 92 for rotating the threaded member 90 passes through a stationary support 94. A spring 98 is housed within a retainer 96 which is affixed to one end of the threaded member 90 as shown. The opposite end of the spring 98 is secured to the arm 82 by the securing means 100, extending within the helical spring 98. As the knurled portion 92 is rotated in one direction, the arm 82 will be positioned away from the magnetic circuit of the transformer 84. If the knurled portion 92 is rotated in the opposite direction, the arm 82 will be positioned closer to the magnetic circuit of the transformer 84. By proper adjustment of the arm 82 by rotation the knurled portion 92 and the threaded member 90, a position of the arm 82 may be found whereby the document advancing mechanism will be driven at a rate to always present a document to the pick-up arm 52 for transferal to the belt transport system formed by the belts 48 and 54 and its associated pulleys. If the documents are not being advanced at a rapid enough rate, then the threaded member 90 would be rotated in such a direction to cause the arm 82 to be moved slightly closer to the metallic circuit of the transformer 84. Similarly, if the documents are being advanced at too rapid a rate, then too great a force would be exerted upon the sensing finger 70 and the threaded member 90 should be rotated in such a direction to cause the arm 82 to be moved slightly away from the pole pieces of the transformer 84.

The positions of the pick-up arm assembly and the sensing means assembly in the apparatus are best shown in the FIGURE 2. The sensing finger 70 is located in the document path and slightly above the horizontal bottom member 16 of the document table or tray 10. In this position, the documents 22 will press against the sensing finger 70; however, only the first document in the document table 10 will engage the sensing finger 70. The force against the sensing finger 70 will be transmitted to the arm 72 through the member 76, which member 76 couples the members 70 and 72 together. Any force exerted against the sensing finger 70 will cause the vertical extending member 78 to be pivoted about the shaft 80 and thus cause rotation of the arm 82 which is located at a position above the documents and out of the way of the path of the pick-up arm 52. The adjusting means, comprising the knurled portion 92, the threaded member 90, the stationary support 94, the retainer 96, and the spring 98 are secured above the pick-up arm 52 so that the sensitivity of the circuit may be adjusted while the pick-up arm 52 is in operation.

The pick-up arm 52 is shown partly in section and is located adjacent the stack of documents for readily engaging the first document from the stack as shown in the FIGURE 1. The pick-up arm 52 may be a bifurcated arm having the vacuum ports 102, shown in sectional view in the FIGURE 2, for engaging the documents and drawing the documents from the document table 10 into the document transport means.

The electrical schematic of the document feeding and advancing device of the present invention is shown in the FIGURE 3. The purpose of the circuit of the FIGURE 3 is to translate the excursions of the arm 82, as developed by the force of the documents against the sensing finger 70, into an output which may be utilized to control the motor and control circuit 38, of the FIGURE 1, which drives the advancing mechanism. Two embodiments of the electrical control are contemplated. If it is desired that the document advancing mechanism be advanced in successive increments, then an A.C. motor may be utilized and the entire circuit of the FIGURE 3 would be employed. If, however, it is desired that the document advancing mechanism be continuously advanced at a slow rate, then a D.C. motor may be employed and the output circuit to the D.C. motor would be taken from the output terminal shown on the emitter of the first transistor of the circuit of the FIGURE 3. This operation will be discussed in detail hereinafter.

As shown in the circuit of the FIGURE 3, conventional alternating current is supplied to the primary winding of a constant voltage step-down transformer 110. For example, 117 volts may be applied to the primary of the transformer 110 and the secondary winding may be arranged so that 6.3 volts are derived at its output terminals. The secondary of the transformer 110 is connected to the primary of the variable gap transformer 84. Resistor coupling is utilized so that a resistor 112 is connected in parallel with the secondary winding of the step-down transformer 110 and the primary winding of the variable gap transformer 84. In addition, a resistor 114 is connected in series with the aforesaid windings. A pilot light 116 and a relay contact 118 are coupled across the secondary winding of the step-down transformer 110 so that energization of the relay 176 closes relay contact 118 (as well as the contact 178) and will insert the pilot light 116 into the circuit thereby indicating the condition of the relay 176.

A.C. attenuation, hysteresis adjustment, and sensitivity are adjusted by the potentiometer 120 which, as shown, is inserted across the secondary winding of the variable gap transformer 84. As noted earlier, the output from the variable gap transformer 84 is dependent upon the position of the arm 82, as shown best in the FIGURES 4 and 5.

Rectification of the output from the secondary of the transformer 84 is obtained by the conventional bridge rectifier 122. The lower end of the secondary winding of the transformer 84 and the lower end of the potentiometer 120 are coupled to the point 124 of the rectifier 122. The variable arm of the potentiometer 120 is connected to the diode rectifier at the connection 126. The rectified output from the rectifier 122 is obtained at the terminals 128 and 130.

A filter comprising a capacitor 132 and a resistor 134 are coupled in parallel and connected across the output terminals 128 and 130 of the rectifier 122. The terminal 130 is connected to the movable arm of a potentiometer 136. A negative voltage, such as −12 volts, is applied to one side of the potentiometer 136 through a resistor 138 and a positive potential, such as +12 volts, is applied to the other side of the potentiometer 136 through a resistor 140. The terminal 128 of the rectifier 122 is also connected to the base electrode of a transistor 142. A negative potential is applied to the collector of the transistor 142 by the conductor 144. The emitter of the transistor 142 is connected to ground through a resistor 146. The circuit comprising the transistor 142 operates in an emitter-follower manner and its output 148 on its emitter may be utilized to operate a D.C. motor for driving the document advancing mechanism when it is desired that a slow but continuous advancement of the document advancing mechanism be desired.

When it is desired to control an A.C. motor, the transistor circuit 142 acts as a driver for the Schmitt trigger circuit comprising the transistors 150 and 152. An output on the emitter of the transistor 142 is connected to the base of the transistor 150. Since the transistors of the circuit are of the PNP type, negative potentials are supplied to the collector of the transistor 150 from the conductor 144 via a resistor 154. The emitter of the transistor 150 is connected to ground through a resistor 156. Similarly, the negative potential on the conductor 144 is supplied to the collector of the transistor 152 through a resistor 158. The output on the collector of the transistor 150 is coupled to the base of the transistor 152 through parallel coupled capacitor 160 and resistor 162. In addition, the base of the transistor 152 is connected to ground through a resistor 164. The emitter of the transistor 152 is connected to ground through a resistor 166 and through the resistor 156 in circuit with the emitter of the transistor 150.

The operation of the Schmitt trigger (also known as a base coupled binary circuit) is well known in the art and its electronic tube configuration counterpart is described starting at page 164 of "Pulse and Digital Circuits" by Millman and Taub, McGraw-Hill Book Company, 1956. Briefly, the circuit comprising the transistors 150 and 152 provides a triggering action and when no signal is present on the base of the transistor 150, the transistor 150 will be in its "off" condition while the transistor 152 will be in its "conducting" state. As a signal is applied to the base of the transistor 142, an output will be applied to the base of the transistor 150 due to the circuit connections which will drive the transistor 150 to its "conducting" state and, through the capacitor 160 and the resistor 162, will drive the transistor 152 to its "off" state. An output can then be taken from the collector of the transistor 152 to operate the relay coil in circuit with the last transistor stage.

The output on the collector of the transistor 152 is coupled to the base of a transistor 170 through the resistor 172. The base of the transistor 170 is also coupled to a positive supply potential (such as +12 volts) through a resistor 174. The emitter of the transistor 170 is connected to ground while the collector is connected to the negative supply voltage through a relay coil 176. The passage of current through the relay coil 176 will pick up the contacts 178 and thus provide a signal to the motor and control circuit 38 of the FIGURE 1.

Operation

Initially, the documents to be sorted are loaded into the document table or tray 10 with the first document near the sensing finger 70 and the last document against the back plate 24. The construction of the speed reducer 42 is such that the back plate may be placed in any desired position and will still drive the back plate 24 forward as indicated by the output of the document force sensing mechanism. The electrical circuits are then energized and the vacuum applied to the pick-up arm 52 and the chamber 62 of the doubles preventor. The document advance mechanism will drive the documents forward until the predetermined force is exerted against the finger 70. The predetermined force will be ascertained by experiment and further determined by the adjustment of the spring 98. Oscillation of the pick-up arm 52 about the member 58 is commenced and the pickup-arm 52 starts to deliver documents to the belt transport system comprising the belts 48 and 54 and their associated pulleys. As the documents are taken from the stack of documents by the pick-up arm 52 and delivered to the transport system, the force exerted by the documents against the sensing finger 70 will be reduced. This reduction in force will cause the sensing finger 70 to be displaced slightly toward the back plate 24. The displacement of the sensing finger 70 will cause the arm 82 of the variable gap transformer 84 to be displaced toward the coil and core structure of the transformer 84. The resulting increase in flux of the transformer 84 will appear as a larger voltage at the terminals 124 and 126 of the rectifier 122 of the FIGURE 3. In the particular circuit elements shown, the greater voltage from the contacts 128 and 130 of the rectifier 122 is in such a negative direction to cause conduction of the transistor 142. Prior to the operation of the circuit, the potentiometers 120 and 136 are adjusted to permit proper operation and biasing levels.

As the transistor 142 of the FIGURE 3 conducts, a voltage will be supplied from its emitter to the base of the transistor 150 and to the output terminal 148. If it is desired to drive a D.C. type of motor in a continuous or substantially continuous document advancing cycle, then the ouput appearing at the terminal 148 may be used to drive such a device. As the output on the emitter of the transistor 142 varies, so will the speed at which the D.C. motor advances the document advancing mechanism.

In the case of operating an A.C. or even a D.C. motor and control circuit, the voltage on the base of the transistor 150 will reach a particular level whereby the transistor 150, which is normally in its "off" state, will be triggered into conduction and cause the normally "on" transistor 152, to be driven into its "off" state. As the transistor 152 is driven "off," the voltage across the resistor 172 will fall and thus cause conduction of the transistor 170 as its base becomes negative with respect to its emitter. That is to say, that since the emitter is at ground potential, the base will be driven to some value below ground in order for the transistor 170 to conduct. As the transistor 170 conducts, current will be drawn through the relay coil 176 and thus cause the contact 178 to close. A control signal is now supplied from the terminals 202 and 204 to drive the motor 38 and thus cause an advancement of the back plate 24 and a progression of the documents forwardly toward the pick-up arm 52.

As the documents 22 are advanced, the force against the sensing finger 70 increases and thus causes the arm 82 to be driven away from the coil and core structure of the transformer 84. With the resulting increase in reluctance of the magnetic circuit, the output from the terminals 128 and 130 of the rectifier 122 becomes more positive and thus driving the base of the transistor 142 toward its emitter voltage and decreasing the output or turning off the transistor 142. If an output is taken from the terminal 148, the driving means will be momentarily slowed down or inhibited. If the Schmitt trigger control circuit is utilized, then a potential on the base of the transistor 150 will be reached whereby the transistor 150 will be turned off and the transistor 152 will be turned on. When the transistor 152 is in its "on" state, the transistor 170 will be off and current flow through the relay coil 176 will be inhibited thus "dropping out" or opening the contacts 178. The advancement of the document advancing means will thus be stopped until the force against the sensing finger 70 is reduced.

As shown in the FIGURE 2, as the documents are advanced and pass the junction 20 formed by the horizontal bottom member 16 and the sloped or downwardly extending portion 18, the documents 22 are "fanned" which reduces the frictional forces between the documents and permits a smaller force to be exerted by the back plate 24 to drive the documents forward for removal by the pick-up arm 52. As the documents supported on the member 18 are inclined from the vertical, there is no tendency for the documents to fall forward. Since the member 16 is rather short and supports fewer documents than the entire stack, it requires less force to drive the documents on the member 16 and thus, greater sensitivity is obtained. Additional documents may be added at any time during the sorting operation by separating the last document from the back plate 24 and while exerting a slight force with the hand toward the pick-up means, the additional documents may be inserted. After the last document has been fed into the belt transport system, the force of the plate 24 against the finger 70 will turn off the document advance mechanism. In addition, photoelectric means 68 may be utilized to inhibit the document advance mechanism.

Thus, there has been described a document sensing and advancing mechanism which is extremely sensitive to the force exerted by the documents against a sensing finger which will cause an output to the document advancing means to be advanced at an "on'" and "off" rate commensurate with the removal of the documents from the document table or tray by a pick-up means. A back plate is provided to drive the documents toward a vacuum pick-up arm. At the point where the sloping portion of the document feed table joins the horizontal portion of the feed table, the documents are slightly "fanned" to reduce the frictional engagement between the documents and thus permit the documents to be driven forward with a minimum amount of force. Also, the tendency of the documents to fall forward is eliminated or reduced. The document back plate, which may be moved to any position during operation to load additional documents into the feed tray, is driven by a motor and gear arrangement, which motor is controlled by the document force sensing means located adjacent the vacuum pick-up arms. The documents are pressed against a sensing arm which arm is coupled mechanically to a transformer whose output is varied according to the force of the documents against the sensing arm. In the case of thick documents or checks, the back plate, which is coupled to the driving motor through an advancing means such as a chain or belt, is advanced a greater distance in "on" and "off" cycles than in the case of a thin check or document. After the checks are taken from the feed tray or table by the vacuum pick-up arm, means are provided in the document way for sensing for the presence of a document and when documents are no longer present in certain predetermined times in the document way, the operation of the document advancing means will be inhibited. The document force sensing mechanism produces an output which may be utilized to drive or advance a device for advancing the documents. A transformer having a core configuration of the figure 8 is utilized in the sensing device. One side of the figure 8 laminations are physically removed from the transformer but are repositioned adjacent the transformer and in a movable manner. Means are coupled from the iron bar or "I" laminations to a member positioned in front of the document so that the various forces exerted by the document against the sensing member will cause the iron bar to be moved away or toward the transformer coil and core. This movement causes a varying flux in the transformer and will cause the transformer to produce an output which is proportional to the distance that the movable iron bar is from the transformer coil and core. Means are provided to adjust the sensitivity of the transformer output, which means are mechanically coupled to the movable iron element. The output of the variable gap transformer is rectified and filtered and applied to a bias level adjustment potentiometer. The output from the potentiometer is coupled to the base of a driver transistor stage whose output can be utilized to drive a D.C. motor or an A.C. motor. In the case of driving a D.C. motor, which in turn drives the back plate of a document feed table, the D.C. motor may be driven substantially continuous and directly from the driver transistor stage. This movement of the back plate of the document advancing means would be continuous and at a rate according to the removal of the documents from the discharge area. In the event that one wishes to drive an A.C. or even a D.C. motor in "on" and "off" cycles, it is preferred that the output of the driver transistor stage be directed to a Schmitt trigger whose output is coupled to a relay driver transistor stage. The relay coil is coupled in series with the collector of the relay driver stage whose output will drive the A.C. motor which is in turn connected to drive the back plate of the document feed table.

The invention may be embodied in other specific forms without departing from the spirit and essential characteristics of the invention. The present embodiment is therefore to be considered in all respects as illustrative and the scope of the invention being indicated by the appended claims rather than the foregoing description, and all changes which come within the meaning and range of equivalency of the claims are therefore intended to be embraced therein.

What is claimed is:

1. Document handling means comprising a document feed table, document advancing means supported upon said feed table, movable document force sensing means positioned adjacent the discharge area of said feed table and in continuous engagement with documents on said feed table, inductive means, means connected to said document force sensing means for electrically coupling said inductive means in such a manner that said means forms a portion of the magnetic circuit of said inductive means, and means coupling the electrical output of said inductive means to actuate said document advancing means.

2. Document sensing means comprising an inductance, a movable sensing finger in continuous engagement and actuated by, the force of the documents against said finger, said sensing finger having a portion positioned adjacent said inductance and forming a part of the magnetic circuit of said inductance, means for rectifying the output of said inductance for varying the electrical output thereof, amplifying means coupled to receive said output of said rectifying means, driving means to advance documents to a discharge area, and means coupling the output of said amplifying means to said driving means for actuation thereof.

3. The combination as defined in claim 2 wherein said driving means is a variable speed electric motor.

4. The combination as defined in claim 2 wherein said inductance and said sensing finger form a variable gap transformer.

5. Document sensing means comprising an inductance having a portion of its magnetic circuit movable in relation to the remainder of said inductance, a movable sensing finger connected to said movable portion of said magnetic circuit and positionable according to the force exerted upon it by a stack of documents, said sensing finger being in continuous engagement with the first document of the stack, means for rectifying the output of said inductance, amplifying means for receiving said rectified output, a trigger circuit responsive to said amplifying means output, a relay driver actuated by said trigger circuit, and driving means coupled to said relay driver and responsive thereto.

6. The combination as defined in claim 5 wherein said trigger circuit is a monostable circuit which is triggered at a predetermined input voltage level.

7. High speed document handling means for advancing intermixed documents of varying thicknesses at a rate commensurate with their removal from document stack supporting means comprising a pivotal sensing finger in continuous engagement with the first document of a stack of documents, a shaft, means coupling said shaft to said sensing finger, an arm extending from said shaft and in movable relationship with said sensing finger, an inductance positioned to include a portion of said arm in its magnetic circuit which produces an output corresponding to the position of said sensing finger and means to receive the output of said inductance for advancing documents on said stack supporting means at a rate to permit said sensing finger to remain substantially in the same position.

8. The claim as defined in claim 7 including means coupled to said arm for biasing said arm to permit adjustment of the sensitivity of said inductance.

9. High speed document handling means for advancing intermixed documents of varying thicknesses at a rate commensurate with their removal from document stack supporting means comprising a pivotal sensing finger in continuous engagement with the first document of a stack of documents, a shaft, means coupling said shaft to said sensing finger, an arm extending from said shaft and in movable relationship with said sensing finger, an inductance positioned to include a portion of said arm in its magnetic circuit which produces an output corresponding to the position of said sensing finger, means for rectifying the output of said inductance, means for receiving the rectified output and to perform an amplifying operation, and means to receive the amplified output for advancing a stack of documents on said stack supporting means.

10. High speed document handling means for advancing intermixed documents of varying thicknesses at a rate commensurate with their removal from document stack supporting means comprising a pivotal sensing finger in continuous engagement with the first document of a stack of documents, a shaft, means coupling said shaft to said sensing finger, an arm extending from said shaft and in movable relationship with said sensing finger, an inductance positioned to include a portion of said arm in its magnetic circuit which produces an output corresponding to the position of said sensing finger, means for rectifying the output of said inductance, means for receiving the rectified output and to perform an amplifying operation, a trigger circuit actuated by said last-mentioned means, and advancing means responsive to said trigger circuit for positioning a stack of documents in such a manner that the position of said sensing finger remains substantially constant.

11. The claim as defined in claim 10 wherein an amplifying circuit including a solenoid in said circuit is coupled between said trigger circuit and said advancing means.

References Cited in the file of this patent
UNITED STATES PATENTS
2,970,835    Schwebel _____ Feb. 7, 1961